US011829745B2

(12) United States Patent
Bruno et al.

(10) Patent No.: US 11,829,745 B2
(45) Date of Patent: Nov. 28, 2023

(54) AUGMENTED CIRCUIT BREAKER POLICY

(71) Applicant: salesforce.com, inc., San Francisco, CA (US)

(72) Inventors: Tomás Bruno, Buenos Aires (AR); Rodrigo Garcia, Buenos Aires (AR)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/570,938

(22) Filed: Jan. 7, 2022

(65) Prior Publication Data

US 2023/0090079 A1 Mar. 23, 2023

Related U.S. Application Data

(60) Provisional application No. 63/246,137, filed on Sep. 20, 2021.

(51) Int. Cl.
| | |
|---|---|
| *G06F 8/65* | (2018.01) |
| *G06F 8/41* | (2018.01) |
| *G06F 9/54* | (2006.01) |
| *G06F 21/62* | (2013.01) |
| *G06F 8/10* | (2018.01) |
| *G06F 8/36* | (2018.01) |
| *G06F 8/71* | (2018.01) |
| *H04L 9/40* | (2022.01) |

(52) U.S. Cl.
CPC ............... *G06F 8/65* (2013.01); *G06F 8/10* (2013.01); *G06F 8/36* (2013.01); *G06F 8/423* (2013.01); *G06F 8/457* (2013.01); *G06F 8/71* (2013.01); *G06F 9/547* (2013.01); *G06F 21/6218* (2013.01); *H04L 63/029* (2013.01); *H04L 63/1458* (2013.01); *H04L 63/20* (2013.01)

(58) Field of Classification Search
None
See application file for complete search history.

(56) References Cited

U.S. PATENT DOCUMENTS

| | | | |
|---|---|---|---|
| 9,338,064 B2 * | 5/2016 | Stratton | G06F 9/5072 |
| 10,437,712 B1 * | 10/2019 | Tyler | G06F 11/3684 |
| 11,228,573 B1 * | 1/2022 | Rangasamy | H04L 12/40006 |

(Continued)

*Primary Examiner* — Philip Wang
*Assistant Examiner* — Rongfa P Wang
(74) *Attorney, Agent, or Firm* — Sterne, Kessler, Goldstein & Fox P.L.L.C.

(57) ABSTRACT

Disclosed herein are system, method, and device embodiments for enriching the capabilities of an API management product by deploying an augmented circuit breaker policy at an API gateway to automate regression analysis. Based on the augmented circuit breaker policy, the API gateway may perform curative remedies when a triggering condition occurs, e.g. rolling back the software release or alerting administrators. In one use case, the augmented circuit break policy may mitigate the damage of a faulty software release by programmatically directing all requests received at the API gateway to a stable version of the API. The benefits may be extended by using machine learning to train normality models on the typical behavior of a particular API. A user may then configure an augmented circuit breaker policy to perform a programmatic rollback when the API gateway recognizes conditions that diverge from normal behavior.

20 Claims, 7 Drawing Sheets

(56) References Cited

U.S. PATENT DOCUMENTS

| | | | |
|---|---|---|---|
| 2016/0092344 A1* | 3/2016 | Bally | G06F 11/3664 |
| | | | 717/124 |
| 2017/0102976 A1* | 4/2017 | Nandakumar | G06F 9/547 |
| 2017/0104641 A1* | 4/2017 | Bradshaw | H04L 41/5054 |
| 2018/0098131 A1* | 4/2018 | Zhou | H04N 21/6373 |
| 2018/0217871 A1* | 8/2018 | Doshi | G06F 9/5072 |
| 2021/0089291 A1* | 3/2021 | Evans | G06F 11/3612 |
| 2022/0182439 A1* | 6/2022 | Zhou | H04L 67/51 |

\* cited by examiner

AUGMENTED CIRCUIT BREAKER POLICY

CROSS-REFERENCE TO RELATED APPLICATIONS

This application claims the benefit of U.S. Provisional Patent Application No. 63/246,137 by Bispo, et al., titled "Enterprise Management Functionality in an Application Programming Interface Gateway," filed on Sep. 20, 2021, which is incorporated by reference herein in its entirety.

BACKGROUND

A safe release of software is an integral stage of the development lifecycle. Numerous tools allow developers to carefully build and extensively test new versions of code. However, despite the best efforts and extensive resources devoted to version control and quality assurance, software bugs unfortunately still bypass this scrutiny and enter production environments.

Additionally, manual errors may occur when performing the actual release. Thus, as a best practice, deployment is conventionally automated to the fullest extent possible. But errors in code and deployment can severely harm organizations, cost money, and cause irreparable damage to customers' trust and goodwill.

To mitigate the impact or blast of a software release, software engineers often release code updates to a limited portion of the full user base. This group can be known as a trial, beta, or testing group. Such a tactic requires unique considerations in architectures that leverage application programming interfaces ("APIs"), which have been widely adopted across the software industry.

BRIEF DESCRIPTION OF THE DRAWINGS/FIGURES

The accompanying drawings, which are incorporated herein and form a part of the specification, illustrate embodiments of the present disclosure and, together with the description, further serve to explain the principles of the disclosure and to enable a person skilled in the arts to make and use the embodiments.

The present disclosure will be described with reference to the accompanying drawings. In the drawings, like reference numbers indicate identical or functionally similar elements. Additionally, the left-most digit of a reference number identifies the drawing in which the reference number first appears.

DETAILED DESCRIPTION OF THE INVENTION

Provided herein are system, apparatus, device, method and/or computer program product embodiments, and/or combinations and sub-combinations thereof, for enriching the capabilities of an API management product by deploying an augmented circuit breaker policy at an API gateway to automate regression analysis. Based on the augmented circuit breaker policy, the API gateway may perform curative remedies when a triggering condition occurs, e.g., rolling back the software release and/or alerting administrators. The API gateway may leverage an Application Performance Monitoring ("APM") tool or solution to determine when the triggering condition arises.

In general terms, an API is an interface that provides and controls access to software functions. An API allows two applications to communicate. An API is associated with an endpoint, i.e., a resource (often represented as a unique URL) that may accept requests to the services provided by the particular API. APIs provide an addition level of security for both the client/requestor and server/responder because limited types of communications transpire between the client and server, obviating the need for any party to fully expose its data.

The independence and security of API-driven architectures decreases development costs, facilitates rapid development, and provides a wide-array of other benefits. This upside has spurred the widespread adoption of micro-service and service-oriented architectures across the software industry. However, organizations' APIs need to be carefully designed, managed, controlled, and administered.

API management tools have been developed to ease this management burden. Such API management tools centralize control and allow API owners to secure APIs with policies, manage client access, organize APIs into groups and products, and perform other suitable management tasks. These monitoring tools may track performance characteristics (e.g., CPU utilization, memory utilization, etc.) and behaviors (e.g., by examining log files) to detect performance trends, policy violations, and potential security issues.

API management tools often deploy an API gateway as an additional abstraction layer in front of the actual APIs. An API gateway authenticates and routes API requests and enforces rate limiting, throttling, and other service level agreements. The API gateway also protects an organizations' data by implementing encryption and access control.

An API gateway uses "policies" to enforce regulations related to security, traffic control, authentication, access, and service level access. Generally speaking, a policy configures the desired behavior of the API gateway across a range of behaviors. The policy may be represented in YAML, JSON, or other suitable human-readable and machine interpretable format, though API management tools frequently provide a graphical user interface ("GUI") to allow administrators to design/customize policies, select from default policies, and manage policies.

For instance, an organization may use a single request routing policy. In such a policy, an organization may provide clients with a single URL that points to a deployed API gateway. The organization may then receive all client requests at that single point. Based on the particular received request, the API gateway may then decide which API endpoint to access based on the single request routing policy and then authenticate the request, log the request/results, perform rate limiting, etc.

One particular use case for an API gateway arises in the context of a software release—i.e., where the API owner releases a new version of an API. To mitigate potential negative impacts, engineers may release the new version only to a subset of the full user base. This subset may be known as the trial, beta, or testing group. The testing group may be a devoted set of testers, a group of users that does not pay for the premium/stable version, or other suitably selected group of users.

In this approach, the API manager may leave a stable version of the API code unperturbed and accessible at the original endpoint. A stable group or premium group of users may retain access to this stable version. The API manager may then create a testing version of the API code that is accessible at a different endpoint. The API gateway then may deploy a single request routing policy to the API gateway that specifies the testing group—i.e., a particular subset of users out of the full user group. The API gateway then may route users in the testing group to the testing endpoint while continuing to route other users to the stable endpoint. This technique cabins the impact of the software release to a confined group of users.

However, when employing such a technique, the recognition of problems (both code-related and deployment-related) in the release is non-trivial. For example, to determine if a problem exists in the testing API, an administrator must manually check logs on each endpoint to view a list of requests/responses on a call-by-call basis. While monitoring tools (APMs) exist that provide access to these logs, the administrator still must examine the logs to determine whether a problem exists. Additionally, performance characteristics (e.g., CPU utilization, memory utilization, etc.) at the endpoints may be indicative of a performance issue and these characteristics may be unknown to the administrator. Accordingly, determining that a problem exists at all presents a threshold technical problem to an administrator.

Additionally, time is essential when a problem arises with a release because a quick rollback (i.e., a return to the stable version for all users) may mitigate damage. In legacy systems where the administrator must determine whether a problem exists, the administrator must then determine whether a curative remedy (such as a rollback) is appropriate and then make the needed configuration changes in the API gateway to rollback the release. Precious time is lost. This may translate into lost revenue and decreased goodwill among users.

No legacy technique or system provides a solution to automate this decision making and to perform programmatic curative remedies to address problems—i.e., to trigger the circuit breaker and reset the API gateway's behavior. Accordingly, a need exists to enrich the capabilities of API management products by deploying an augmented circuit breaker policy at an API gateway. Such an augmented circuit breaker policy may automate the regression analysis following the release of a new version of an API. For example, an augmented circuit breaker policy may specify that an error rate of greater than 5 percent at any endpoint should trigger a shifting of traffic to the original version of the service and/or generate an alert to send to an administrator. Or, for another example an augmented circuit breaker policy may monitor the average response times of the responses sent by the API, and if the average response times exceeds a configured threshold average response time, then the augmented circuit breaker may trigger. The augmented circuit break policy may thus mitigate the damage of a bad release.

A further technical benefit may be realized by using machine learning to train normality models on the typical behavior of a particular API. A user may then configure an augmented circuit breaker policy to perform a programmatic rollback when the API gateway recognizes conditions that diverge from normal behavior. This eases the configuration burden on an administrator because the administrator no longer needs to understand what conditions are normal with respect to a particular API's behavior and performance.

Figure 1:
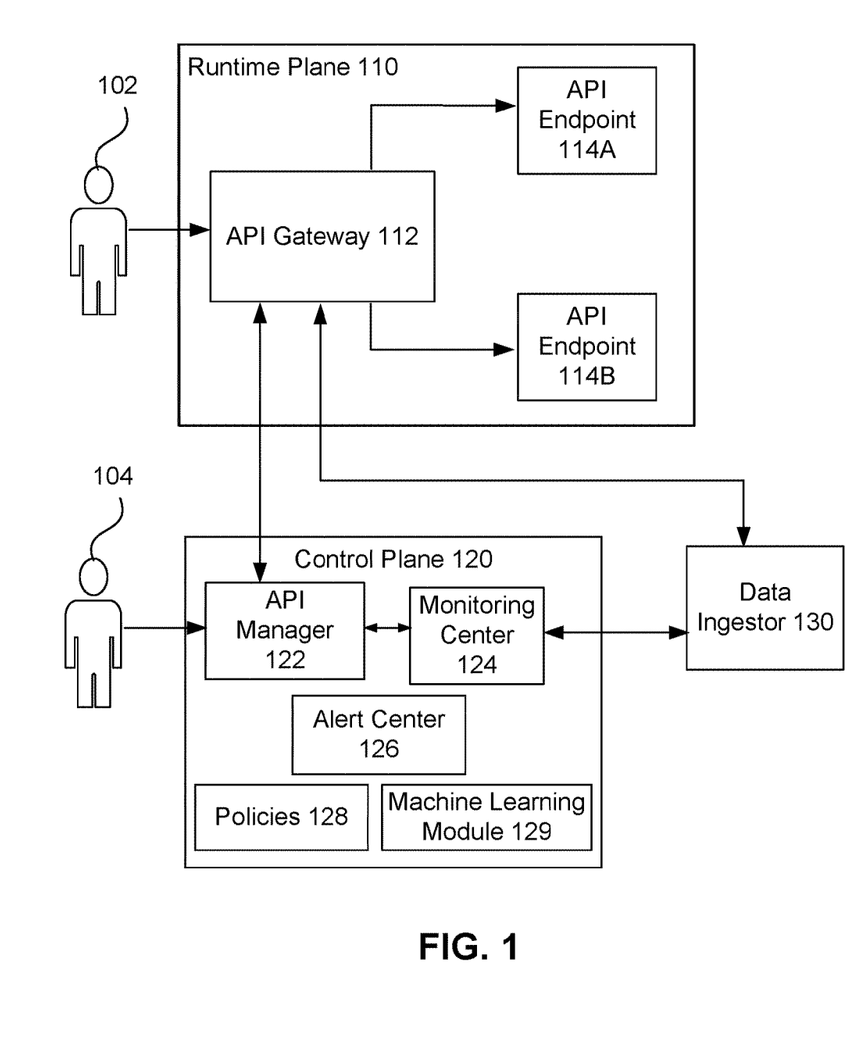
FIG. 1 is a block diagram of environment for implementing a circuit breaker policy on an API gateway, according to some embodiments.

FIG. 1 is a block diagram of environment 100 for implementing an augmented circuit breaker policy on an API gateway, according to some embodiments. As illustrated in FIG. 1, environment 100 may include client 102, API owner 104, runtime plane 110, API gateway 112, API endpoints 114, control plane 120, API management tool 122, monitoring center 124, alert center 126, policies 128, machine learning module 129, and data ingestor 130.

Client 102 may be an individual or computer program accessing an API managed by an organization. For example, client 102 may be a member of a business, organization, or other suitable group that is accessing the API using a suitable computing system. One skilled in the relevant arts will appreciate the wide range of computer applications that may access a provided API. Client 102 may access the API using a personal digital assistant, desktop workstation, laptop or notebook computer, netbook, tablet, smart phone, mobile phone, smart watch or other wearable, appliance, part of the Internet-of-Things, and/or embedded system, to name a few non-limiting examples, or any combination thereof. Client 102 may be a human being, but client 102 may also be an artificial intelligence construct or other computer system programmatically accessing the API. Client 102 may employ, i.e., connect to, a network or combination of networks including the Internet, a local area network (LAN), a wide area network (WAN), a wireless network, a cellular network, or various other types of networks as would be appreciated by a person of ordinary skill in the art.

API owner 104 may be a developer or other individual designing, developing, deploying, and managing APIs using an API management tool. API owner 104 may be a member of a business, organization, or other suitable group. API owner 104 may be a human being, but API owner 104 may also be an artificial intelligence construct. API owner 104 may connect to the API management tool using a personal digital assistant, desktop workstation, laptop or notebook computer, netbook, tablet, smart phone, mobile phone, smart watch or other wearable, appliance, part of the Internet-of-Things, and/or embedded system, to name a few non-limiting examples, or any combination thereof. API owner 104 may employ, i.e., connect to, a network or combination of networks including the Internet, a local area network (LAN), a wide area network (WAN), a wireless network, a cellular network, or various other types of networks as would be appreciated by a person of ordinary skill in the art.

Runtime plane 110 may be a high-level organizational/architectural structure that includes gateways, applications, APIs, and other services used by an organization such as API owner 104. Runtime plane 110 may further include components that facilitate access to the managed APIs to client 102 including a runtime server and runtime services that support the API-driven architecture. Runtime plane 110 may include API gateway 112 and API endpoints 114, such as API endpoint 114A and API endpoint 114B.

API gateway 112 may be a dedicated orchestration layer resting atop of an organizations' APIs and providing an additional abstraction layer in front of the actual APIs to separate orchestration concerns from implementation concerns. API gateway 112 may be configured to receiving any incoming requests and provide corresponding responses between client 102 and API endpoints 114. API gateway 112 may apply throttling, security, caching, and logging to an organization's APIs. API gateway 112 may authenticate and route API requests. API gateway 112 may enforce rate limiting, throttling, and other service level agreements. API gateway 112 may implement encryption and access control. API gateway 112 may use policies, such as described below as policies 128, to enforce these various regulations related to security, traffic control, authentication, access, and service level access. When implementing an augmented circuit breaker policy, API gateway 112 may push metrics to data ingestor 130 on an ongoing basis and further interact with API management tool 122 and monitoring center 124 to perform the behaviors specified in the augmented circuit breaker policy.

API endpoints 114, such as API endpoint 114A and API endpoint 114B, may be associated with managed APIs. In general terms, an API facilitates communication between two software applications. API endpoints 114 may represent resources and may be a unique URL to each resource. API endpoints 114 may accept requests to the services provided by the particular API. In one embodiment, API endpoint 114A may provide a stable version of a service offered by the API and API endpoint 114B may provide a testing/beta version of a service offered by the API. In another embodiment, API endpoint 114A may provide a premium version of a service while API endpoint 114B may provide a free version of the service. One skilled in the art will appreciate that many such arrangements and use cases exist given the wide range of APIs and API architectures employed by organizations. Moreover, while only two API endpoints 114 are displayed in FIG. 1, this is done merely for simplicity of explanation. One skilled in the arts will recognize that many arrangements exist having multiple APIs and multiple versions of each API to accommodate a far-ranging variety of additional use cases.

Control plane 120 may be a high-level organizational/architectural structure that allows API owner 104 to configure the behavior of the APIs in runtime plane 110 and API gateway 112. Control plane 120 may include API management tool 122, monitoring center 124, alert center 126, policies 128, and machine learning module 129.

Figure 2:
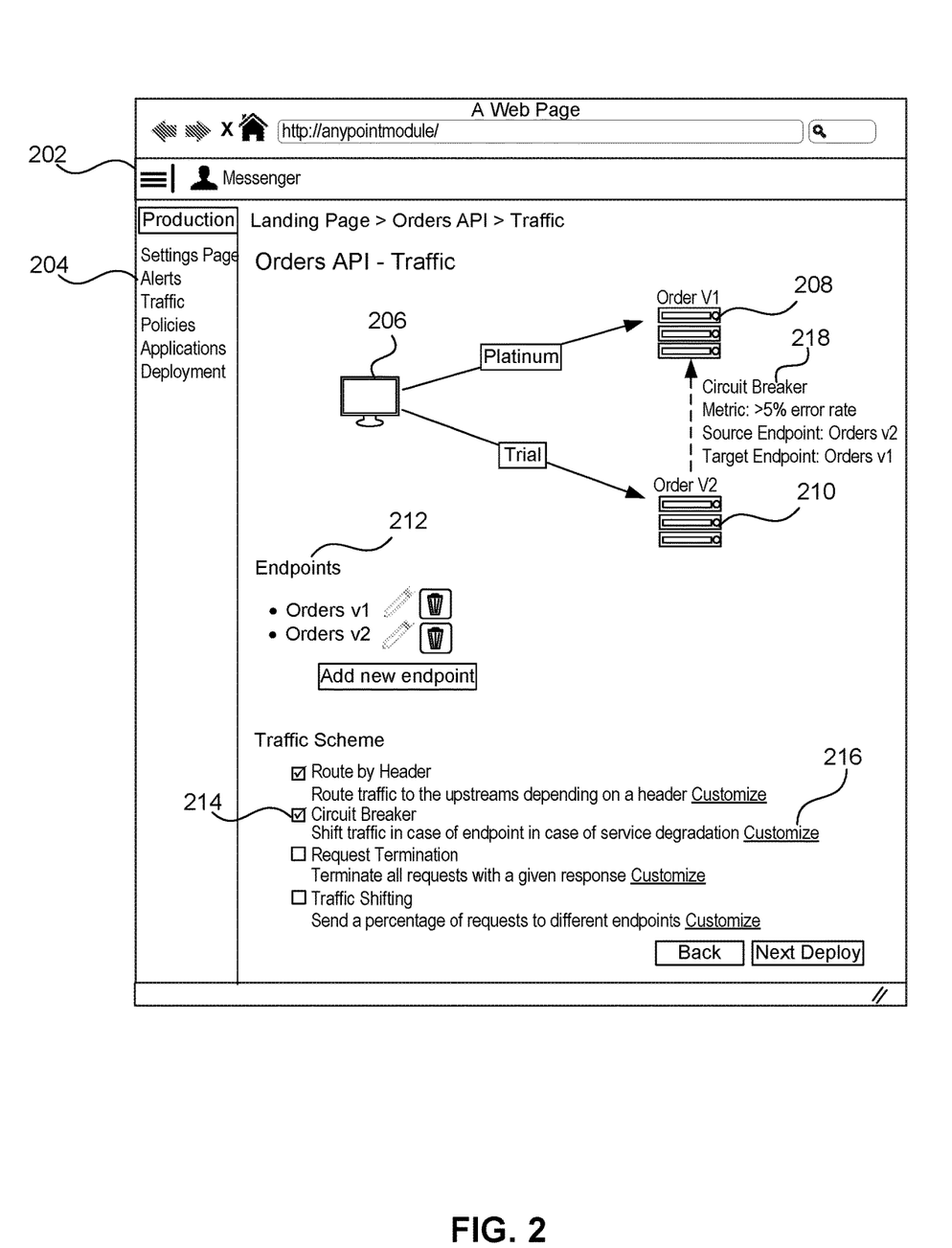
FIG. 2 is an example screen display of an API manager that allows a user to configure an augmented circuit breaker policy, according to some embodiments.

API management tool 122 may allow API owner 104 to configure, manage, govern, and secure APIs in runtime plane 110. API management tool 122 may allow users to secure APIs with policies such as those described in further detail below as policies 128. API management tool 122 may manage client access, group APIs into products, and interact with monitoring center 124 to provide analytics and insights into the behavior of configured APIs. For example, API management tool 122 may allow an organization to add a new API instance to the existing configuration, provide credentials, search for managed APIs, etc. API management tool 122 may allow an organization to enforce service level agreements, e.g., by providing SLA tiers to limit the number of requests that any particular client may make to a particular API. API management tool 122 may provide a GUI through which API owner 104 may configure the applications, such as the interface characterized in screen display 200 below. API management tool 122 may provide capabilities to offer a service mesh to enforce consistent security across micro-services from a single, centralized location.

Monitoring center 124 may allow organizations to monitor APIs in a central location using customizable dashboards and alerts. Monitoring center 124 may store or have access to historical log data about APIs operating in runtime plane 110. Monitoring center 124 may display metrics about the APIs in runtime plane 110 based on captured information about the various APIs. Monitoring center 124 may integrate functionality from external monitoring tools and/or access data stored in data ingestor 130.

Alert center 126 may allow organizations to configure alerts about behavior within the APIs in runtime plane 110. Alert center 126 may allow a user to set conditions under which an alert should be generated, appropriate individuals to alert, and a manner of alerting the individuals. For example, alert center 126 may be configured to alert an administrator of high CPU or memory utilization at an endpoint, unusual or suspicious behavior, failed backup jobs, and other suitable environmental concerns.

Policies 128 may allow organizations to enforce regulations to manage security, control traffic, and improve adaptability at API gateway 112. Policies 128 may configure the desired behavior of the API gateway across a range of behaviors—e.g., policies 128 may control authentication, access, allotted consumption, and service level access. One particular type of policy may be an augmented circuit breaker policy that specifies the conditions under which a particular corrective action, e.g., what corrective action should be taken when a triggering condition arises after a software release. For example, an augmented circuit breaker policy may specify that an error rate of greater than 5 percent at any endpoint should trigger a shifting of traffic to the original version of the service and/or generate an alert to send to an appropriate user. Or, for another example an augmented circuit breaker policy may monitor the average response times of the responses sent by the API, and if the average response times exceeds a configured threshold average response time, then the augmented circuit breaker may trigger. In yet another example, policies 128 may monitor the CPU or memory utilization of an API endpoint, and if the CPU or memory utilization exceeds a configured threshold for a particular period of time, the augmented circuit breaker may trigger.

Policies 128 may be represented in YAML, JSON, or other suitable human-readable and machine interpretable format. While policies 128 may take various forms within the context of this disclosure, a sample text-based augmented circuit breaker policy is displayed below that specifies that an error rate of greater than 5 percent at any endpoint should trigger a shifting of traffic to the original version of a service.

```
apiVersion: gateway.mulesoft.com/v1alpha1
kind: PolicyBinding
metadata:
  name: ingress-http-auth
spec:
  targetRef:
    kind: ApiInstance
    name: ingress-http
  policyRef:
    kind: Extension
    name: route-circuit-breaker
  config:
    metric: error-rate
    threshold: >5%
    period: –5m
    closedCircuit: # Normal state
      destinationRefs:
        name: authorization-v1
        kind: Service
        header-name: customer-type
        header-value: Platinum
        name: authorization-v2
```

```
kind: Service
  header-name: customer-type
  header-value: Trial
openedCircuit: # Failed state
  destinationRefs:
    name: authorization-v1
    kind: Service
```

API management tool 122 may provide a GUI that allows API owner 104 to select from default policies and customize policies. To ensure consistent and coordinated behavior, policies 128 may be pushed or otherwise communicated to the various planes, e.g., to API gateway 112, monitoring center 124, etc.

Machine learning module 129 may train and store normality models to represent the normal behavior of APIs such as those accessible at API endpoints 114. Machine learning module 129 may monitor both quantitative characteristics at API endpoints 114 (e.g., CPU utilization and memory utilization) and behavioral characteristics (error rate, types of interactions, etc.) to build an appropriate normality model. For example, machine learning module 129 may deploy a neural network and train the neural network over time based on application characteristics. The normality model may then be used by API gateway 112 to determine when a deviation occurs from normal behavior at an API. Machine learning module 129 may train and store a normality model for each API deployed in runtime plane 110 or a suitable subset of the APIs. For example, machine learning module 129 may store a normality model for those APIs with an augmented circuit breaker policy configured having the machine-learning option selected. When an augmented circuit breaker policy is configured and deployed at API gateway 112 with a machine learning option selected, an appropriate corrective action may be taken when such a deviation occurs, as described in further detail below with reference to FIGS. 5 and 6.

Data ingestor 130 may be a high-level architectural structure that allows API owner 104 to store metrics, logs, and other information related to the applications and services in runtime plane 110. Data ingestor 130 may house data related to logging performed by monitoring center 124. Data ingestor 130 may leverage a relational database, a NoSQL database or other horizontally scaling database, a digital ledger technology or blockchain, or any other suitable storage mechanism, or a suitable combination thereof. For instance, data ingestor 130 may harness any commercially available database management system to store and retrieve data. Data ingestor 130 may further be a message queue or stream processing platform such as Apache Kafka or Apache Spark or other data storage systems like Apache Hadoop, HDFS, or Amazon S3, to name just some examples. Data ingestor 130 may be a data lake, data silo, semi-structured data system (CSV, logs, xml, etc.), unstructured data system, binary data repository, or other suitable repository. Data ingestor 130 may store thousands, millions, billions, or trillions (or more) of objects, rows, transactions, records, files, logs, etc. while allowing for the creation, modification, retrieval, archival, and management of this data. In an embodiment, data ingestor 130 may use a centralized storage area network (SAN), network-attached storage (NAS), redundant array of independent disks, and/or any other configuration of storage devices to supply sufficient storage capacity to store database tables and supporting structures. Sufficient storage may alternatively exist in any other physically attached magnetic storage, cloud storage, or additional storage medium.

FIG. 2 is an example screen display 200 of an API manager that allows a user to configure an augmented circuit breaker policy, according to some embodiments. As illustrated in FIG. 2, screen display 200 may include API manager interface 202, menu 204, API configuration 206, API stable version 208, API trial version 210, endpoints 212, circuit breaker option 214, details link 216, and circuit breaker description 218.

API manager interface 202 may be a GUI provided by API management tool 122 through which API owner 104 may configure, manage, and monitor API gateway 112 and the APIs in runtime plane 110 accessible at API endpoint 114A and API endpoint 114B. API manager interface 202 is merely exemplary and one skilled in the arts will recognize that other suitable arrangements for the interface may be provided to allow API owner 104 to manage APIs and configure an augmented circuit breaker policy. In the exemplary interface provided in FIG. 2, a user views the "Traffic" page for an "Orders API." In this exemplary interface, the "Orders API" is just a general API (such as those accessible via API endpoints 114) provided for illustrative purposes. For example, the "Orders API" may be an API that takes orders for merchandise, food, etc., but again, this is not restrictive and included only for ease of illustration.

Menu 204 may provide an ability to navigate within API manager interface 202. Menu 204 may include links or other suitable manner of accessing particular sections within API manager interface 202. In the exemplary embodiment provided in FIG. 2, menu 204 may include "settings page," "alerts," "traffic," "policies," "applications," and "deployment," with each option linking to a sub-page that allows API owner 104 to view and configure aspects of the APIs related to that selection. For example, a user clicking "policies" may be routed to a page to view applicable polices, customize policies, and perform other tasks related to the policies, such as described above as policies 128. For another example, clicking "traffic" may display a page similar to the page displayed in FIG. 2, where a user may view and configure options related to "Traffic" controls for a particular API.

API configuration 206 may display the traffic configuration for a particular API. In this illustration, API configuration indicates two available versions of the "Orders API"—a "Platinum" version and a "Trial" version. In some embodiments, API configuration 206 may be dynamically editable as opposed to static. For example, API owner 104 may add additional endpoints or versions and access/edit detailed information about each endpoint (e.g., policies 128 applied to the endpoint) in API configuration 206.

API stable version 208 may be a first version of an API provided to the "Platinum"users. In this embodiment, particular clients may pay a premium rate to retain access to the stable version of the API and thus not be subjected to beta/testing versions of the software. However, as discussed above, other use cases exist having separate, multiple versions of an API. For example, the user base may generally retain access to the stable version during testing with a limited number of users selected for testing purposes accessing a different version. In this illustration, API stable version 208 may correspond to API endpoint 114A.

API trial version 210 may be a second version of an API provided to the "Trial"users. In this example, certain clients may not pay a premium rate and thus access beta versions of the software. Or a group of testing users may access API trial version 210 without impacting the general user population. In this illustration, API trial version 210 may correspond to API endpoint 114B.

Endpoints 212 may allow API owner 104 to add additional endpoints to API configuration 206. For example, API owner 104 may choose to add a staging version as a separate endpoint. Moreover, endpoints 212 may change over time. For example, after deploying API trial version 210 to a segment of a user base for a period of time, engineers may determine that the release is stable enough to release to all customers. At such a point, API owner 104 may delete the first version of the release from endpoints 212.

Circuit breaker option 214 may allow API owner 104 to configure an augmented circuit breaker policy for an API. Selecting circuit breaker option 214 may create an augmented circuit breaker policy to automate regression analysis following the release of a new version of an API. In the exemplary FIG. 2, for example, the augmented circuit breaker policy may specify the conditions under which the "Trial" users, which access API trial version 210, should shift back to accessing API stable version 208.

Details link 216 may provide a mechanism through which API owner 104 may customize the augmented circuit breaker policy for an API. For example, details link 216 may route API owner 104 to a details page for the augmented circuit breaker policy to view and update the particular augmented circuit breaker policy in place for that API. Such a details page is described in further detail below with reference to FIG. 3. However, this is merely exemplary and any suitable interface may be provided to allow a user to configure the augmented circuit breaker policy.

Circuit breaker description 218 may display the details of an augmented circuit breaker policy in place in API configuration 206. In the illustrative interface portrayed in FIG. 2, circuit breaker description 218 displays a dotted arrow from API trial version 210 to API stable version 208 indicating that a rollback from API trial version 210 to API stable version 208 may occur when certain triggering conditions are met. Circuit breaker description 218 may further display those triggering conditions—e.g., when the metric of error rate exceeds 5% in the example in FIG. 2. Circuit breaker description 218 may further display the source endpoint ("Orders V2") an the target endpoint ("Orders V1"). In other embodiments, these endpoints may be a URL through which the endpoint is accessed by client 102.

Figure 3:
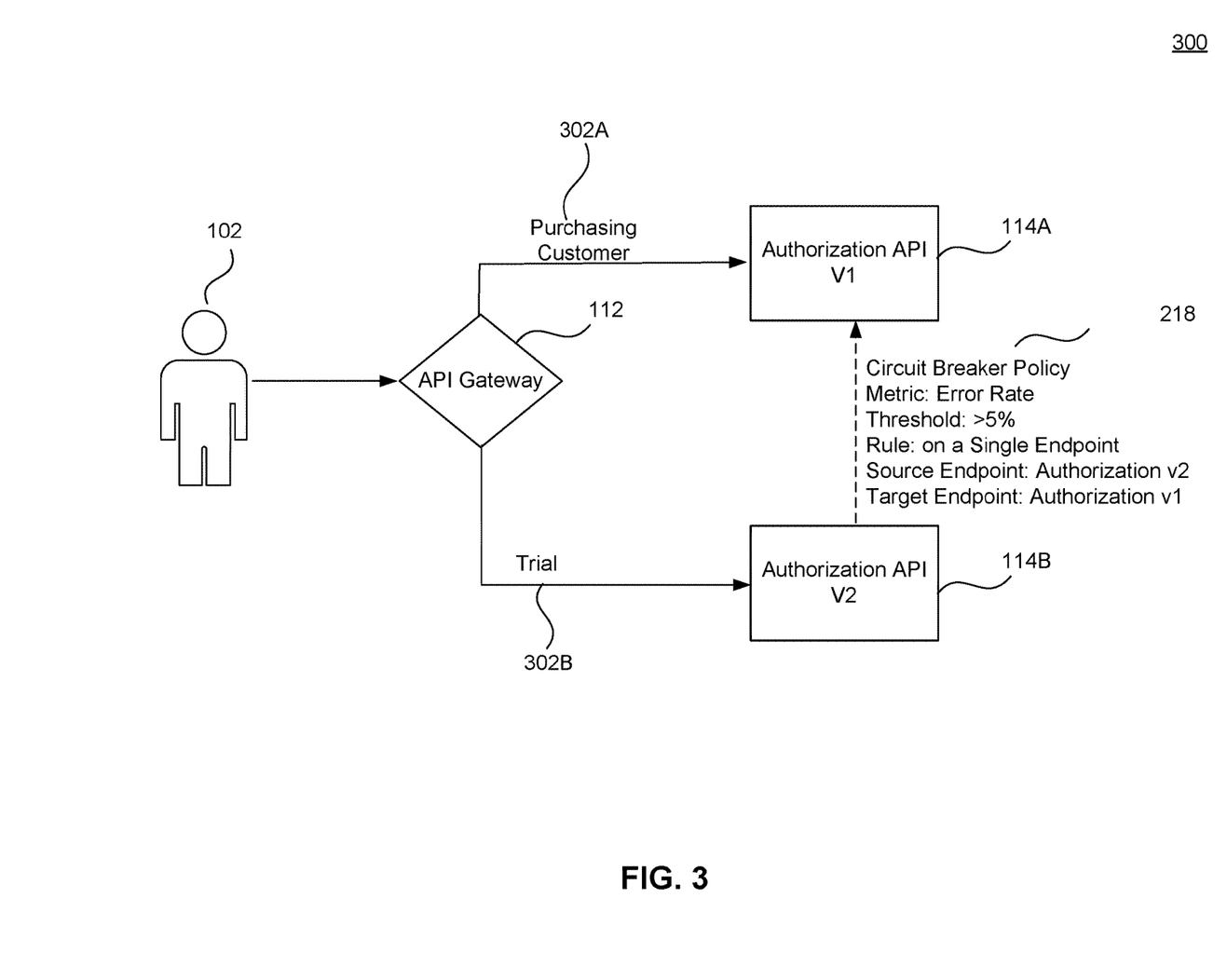
FIG. 3 is an example screen display of an augmented circuit breaker policy details page, according to some embodiments.

FIG. 3 is an example screen display 300 of an augmented circuit breaker policy details page, according to some embodiments. The screen display provided in FIG. 3 is merely exemplary, and one skilled in the relevant art(s) will appreciate that many approaches may be taken to provide a suitable screen display 300 in accordance with this disclosure. Screen display 300 may include labels 302 in addition to several components displayed in FIG. 2 and discussed above. Labels 302 may provide additional information about the subsets of users that may access API target version 210 and API stable version 208.

While displayed as a static page in the exemplary details page provided in screen display 300, circuit breaker description 218 and other fields in FIG. 3 may also be readily editable by API owner 104 in other embodiments. For example, circuit breaker description 218 may include editable fields or dropdown items from which API owner 104 may select appropriate parameters. For instance, the source and target endpoints may be dropdown menus having the different versions of the API that are configured in API management interface 202. Similarly, metric may include a variety of selections available to API owner 104 when configuring an augmented circuit breaker policy. FIG. 3, for example, displays the metric as the error rate. However, additional metrics may be used as the circuit breaker's triggering condition including: response times, CPU utilization, memory utilization, and any other suitable behavioral or quantitative conditions. The breadth of the available metrics will be understood by one skilled in the relevant arts, particularly the wide-array of metrics typically used to monitor the performance and behavior of software applications.

An additional option may be provided in circuit breaker description 218 to select "machine learning" as opposed to configuring a particular metric and threshold. Selecting this option may configure an augmented circuit breaker policy to perform a programmatic rollback when the API gateway recognizes conditions that diverge from normal behavior. Normal behavior of the system may be determined with reference to a normality model. The normality model may be trained using machine learning to ascertain the typical behavior of a particular API. This option is described in further detail below with reference to FIG. 6.

Figure 4:
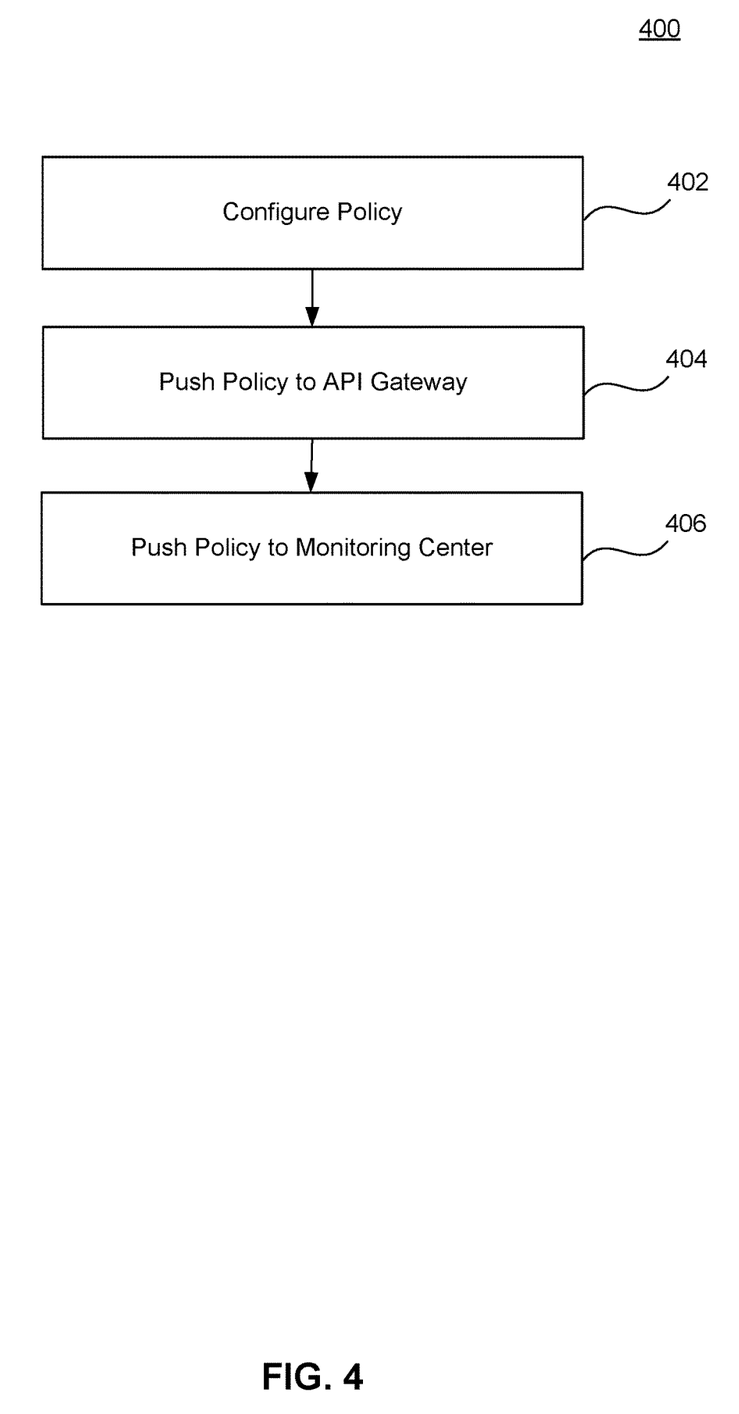
FIG. 4 illustrates a method for configuring an augmented circuit breaker policy, according to some embodiments.

FIG. 4 illustrates a method 400 for configuring an augmented circuit breaker policy, according to some embodiments. Method 400 may be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art(s).

In 402, API owner 104 may configure an augmented circuit breaker policy, i.e., a particular type of policy among policies 128 in API management tool 122. An exemplary interface for configuring an augmented circuit breaker policy is described above with reference to FIGS. 2 and 3. API owner 104 may specify the endpoint(s) to which the augmented circuit breaker policy is applicable. API owner 104 may specify a metric and threshold that serve as triggering conditions for the augmented circuit breaker policy. API owner 104 may specify an action or actions to occur when the circuit breaker is triggered—i.e., when the triggering conditions are satisfied. For example, API owner 104 may specify that an error rate exceeding 5% may result in a rollback, with all traffic shifting from API endpoint 114B to API endpoint 114A. Such an augmented circuit breaker policy may mitigate the damage of a bad software release or a manual deployment error. Other actions may be configured by API owner 104—e.g., API owner 104 may configure an alert to be generated by alert center 126 and sent to an administrator in the event of the triggering condition occurring (without causing a programmatic rollback). Additional suitable actions will be known to those with skill in the relevant arts. In one embodiment, API owner may select a machine learning option, where a divergence from normal behavior may be recognized with reference to machine-learning-trained normality model that reflects the typical behavior of a particular API. This machine-learning option obviates the need for API owner 104 to understand normal behavior and performance for each API in runtime plane 110. When API owner 104 configures the policy, API management tool 122 may store the policy in policies 128 for later editing and adjustment.

In 404, API management tool 122 may push the policy or otherwise communicate the policy to API gateway 112. API gateway may then apply and implement the policy within runtime plane 110. In some embodiments, the augmented circuit breaker policy may replace an default or existing policy in place at API gateway 112 for the API. However, in other embodiments, multiple policies may be implemented in API gateway 112 simultaneously. In some embodiments, unique policies may be applied to different APIs.

In 406, API management tool 122 may push the policy or otherwise communicate the policy to monitoring center 124. Because certain metrics (e.g., CPU utilization/memory utilization) may require additional logging to occur or otherwise rely on data available in monitoring center 124, monitoring center 124 may need to have an awareness of augmented circuit breaker policies in place on API gateway 112. As discussed in further detail below, in certain embodiments, monitoring center 124 may monitor the behavior of the endpoints to determine when a triggering condition occurs to trigger the circuit breaker. In such an embodiment, monitoring center 124 and/or API management tool 122 may then communicate either an updated policy or an indication of the triggered circuit breaker to API gateway 112 to cause API gateway 112 to perform the appropriate curative action.

Figure 5:
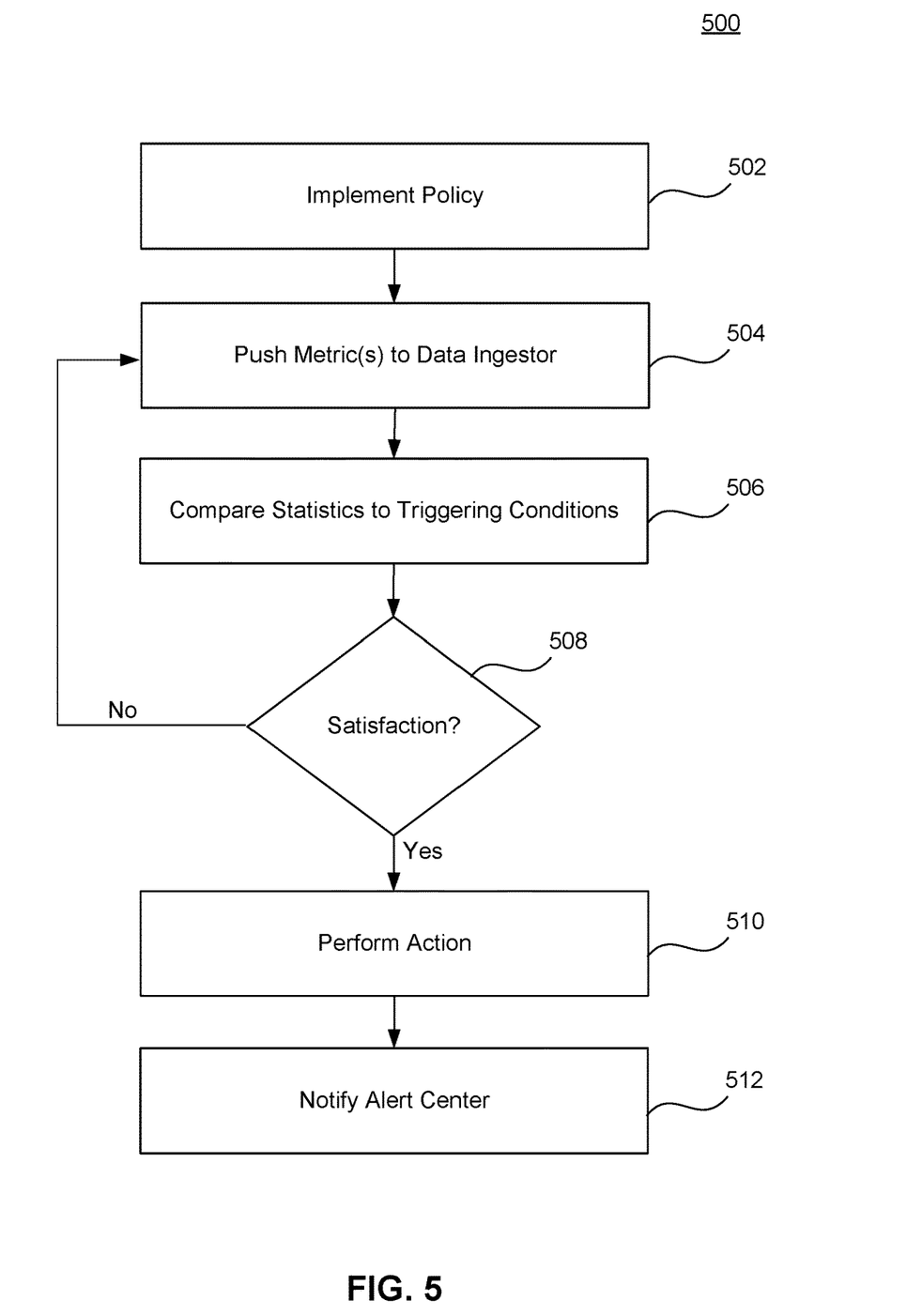
FIG. 5 illustrates a method for applying an augmented circuit breaker policy, according to some embodiments.

FIG. 5 illustrates a method 500 for applying an augmented circuit breaker policy, according to some embodiments. Method 500 may be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art(s).

In 502, API gateway 112 may implement an augmented circuit breaker policy configured by API owner 104. API gateway 112 may push a policy to monitoring center 124 and/or alert center 126. API gateway 112 may receive a policy configured in API management tool 122 by API owner 104, as described above in FIG. 4. API gateway 112 may apply the policy to either an entire API or to specific methods and resources of the API. Once the policy is applied, requests received at API gateway 112 may be processed in accordance with the policy, the requests routed to the appropriate API endpoint, logging performed, SLA enforced, and other suitable policy-based actions performed. In some embodiments, a unique policy may be applied for each API managed in runtime plane 110.

In 504, API gateway 112 may push metrics to data ingestor 130 and/or monitoring center 124 as requests to the API are received and processed. These metrics may include statistics relevant to a configured augmented circuit breaker policy and other information tracked in monitoring center 124. For example, API gateway 112 may monitor the number of errors (e.g., 500 errors) returned from the API to client 102 and send an appropriate communication to monitoring center 124 to track this data. API gateway 112 may also monitor the average response times of the responses sent by the API, the CPU or memory utilization of the API endpoint, or other suitable metrics. In this manner, API gateway 112 and/or monitoring center 124 may build a statistical profile used to enforce the augmented circuit breaker policy.

In 506, API gateway 112 and/or monitoring center 124 may compare metrics in the statistical profile built in 504. API gateway 112 may thus monitor the behavior and performance of the API against the thresholds and metrics configured in the augmented circuit breaker policy. For instance, if the percentage of errors is greater than 5% (over a statistically significant sample size), API gateway and/or monitoring center 124 may determine that the triggering condition is satisfied and that the configured corrective action (e.g., rollback) should be undertaken. In such an example, API gateway 112 may track the number of successful (non-errors) responses sent to users and compare this value to the number of errors return to determine whether a configured rollback action should be applied. In another example, API gateway 112 may monitor the average response times of the responses sent by the API, and if the average response times exceeds a configured threshold average response time, then the augmented circuit breaker may determine a satisfaction of the triggering condition. In yet another example, API gateway 112 may monitor the CPU or memory utilization of an API endpoint. API gateway 112 may apply appropriate statistical techniques (e.g., waiting for a significant enough sample size) to determine if a particular configured triggering condition is satisfied.

In 508, API gateway 112 may determine if the triggering condition is satisfied. If not, then method 500 may proceed to 510. If yes, then method 500 may return to 504 to continue to monitor appropriate metrics.

In 510, API gateway 112 performs the configured corrective action. As described above, in one embodiment, API gateway 112 may rollback the release by shifting all traffic to the stable version of the API. Such a technique involves changing the re-direction of traffic to a particular endpoint, e.g., API gateway may route all users to API endpoint 114A after the triggering condition occurs (if no triggering condition occurs, a segment of users may get directed to API endpoint 114B). One approach to facilitate this change is for API management tool 122 to push a new policy (such as described above as policies 128) to both API gateway 112 and monitoring center 124. This may simplify the solution by allowing API gateway 112 to apply any policy that is in place without housing the logic to modify the policy. As discussed above, one such action may be a programmatic rollback following the release of a new version of an API to a certain population of users. This programmatic rollback returns stable service to this population of users without the need for human intervention, saving time and mitigating damage. However, other actions may be configured in the augmented circuit breaker policy within the context of this disclosure.

In 512, API gateway 112 may notify alert center 126 that the change occurred. This allows alert center 126 to generate and transmit an appropriate notification that the errors are occurring to the appropriate administrators. As discussed above, the nature of this message and the recipients may be configured in API management tool 122 when configuring the augmented circuit breaker policy.

Figure 6:
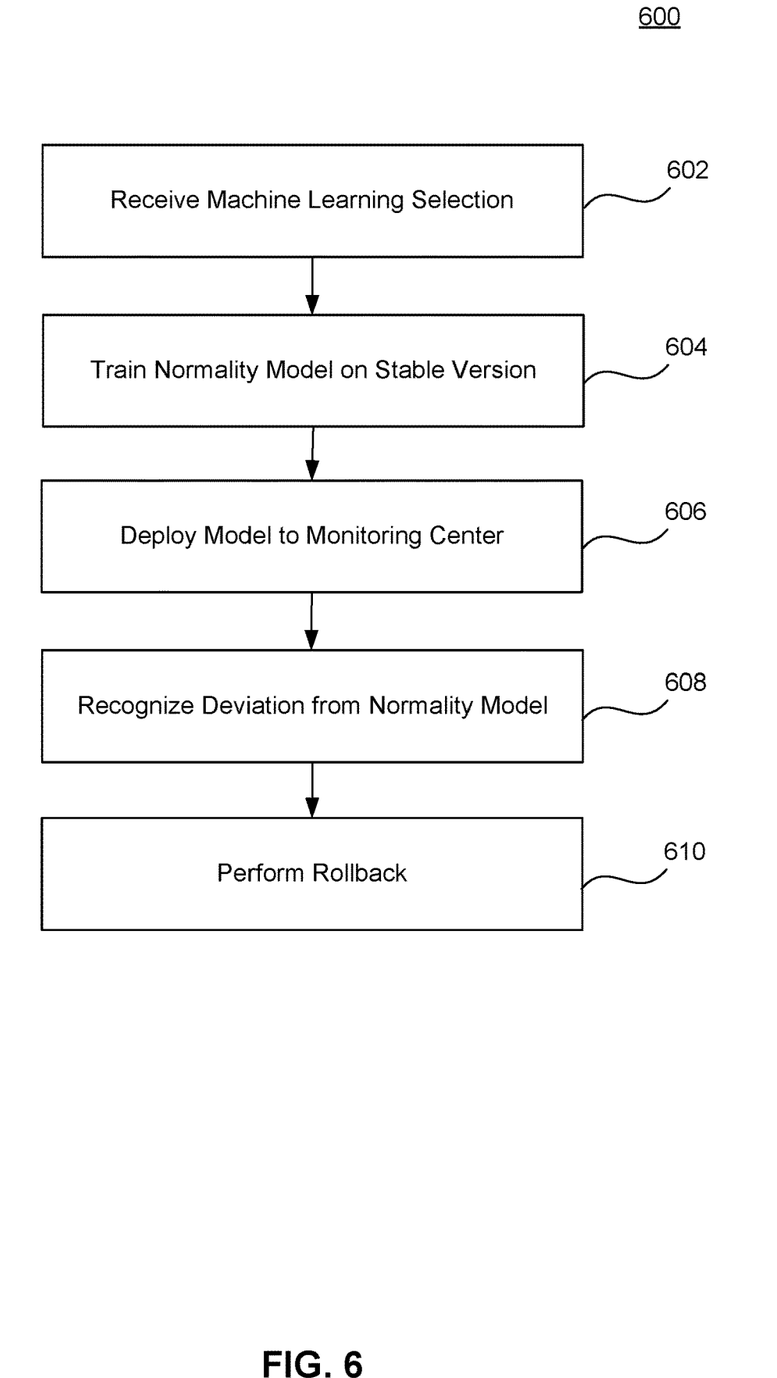
FIG. 6 illustrates a method for using machine learning as a triggering condition in an augmented circuit breaker policy, according to some embodiments.

FIG. 6 illustrates a method 600 for using machine learning as a triggering condition in an augmented circuit breaker policy, according to some embodiments. Method 600 may be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 6, as will be understood by a person of ordinary skill in the art(s).

In 602, API management tool 122 may receive a machine learning selection as an option from API owner 104 when configuring an augmented circuit breaker policy in API management tool 122. For example, API owner 104 may select a machine learning option on an augmented circuit breaker policy details page such as that discussed above with reference to FIG. 3. The selection of the machine learning option may indicate that the augmented circuit breaker policy should use a deviation from normal behavior as a triggering condition for the configured action (as opposed to API owner 104 selecting and configuring a particular metric and threshold).

In 604, machine learning module 129 may train a normality model on the normal behavior of an API in runtime plane 110. One skilled in the relevant arts will understand that a variety of approaches may be employed to build an appropriate normality model including . Machine learning module 129 may consider both behavioral factors (e.g., error rates, types of interactions) and quantitative factors (e.g., CPU and memory utilization) in building a profile of normal behavior at a particular API. For example, machine learning module 129 may deploy a neural network and train the neural network over time based on application characteristics. The normality model may then be used by API gateway 112 to determine when a deviation occurs from normal behavior at an API. In one embodiment, the factors to consider when building the normality model may be selected by the user when configuring the augmented circuit breaker policy. In some embodiments, 604 may be performed prior to the configuration of the machine learning selection in 602 so the normality model exists prior to the selection of the option by API owner 104.

In 606, machine learning module may deploy the normality model to monitoring center 124, monitoring center 124 and/or API gateway 112. As discussed in further detail below, in certain embodiments, monitoring center 124 may monitor the behavior of the endpoints to determine when a triggering condition occurs to trigger the circuit breaker.

In 608, monitoring center 124 and/or API gateway 112 may recognize a deviation from the normal behavior in traffic patterns and quantitative indicators when determining whether the augmented circuit breaker policy should be triggered and the configured curative action (e.g., rollback) be performed. A person of skill in the relevant arts will understand that a variety of techniques may be employed to determine when/if a deviation occurs from a normality model, e.g., Gaussian distribution, Bayesian analyses, normality tests, and other suitable statistical techniques.

In 610, API gateway 112 may perform the rollback or other corrective action that is configured in the augmented circuit breaker policy. For example, after a rollback, API gateway may direct all requests to an API to API stable version 208.

Figure 7:
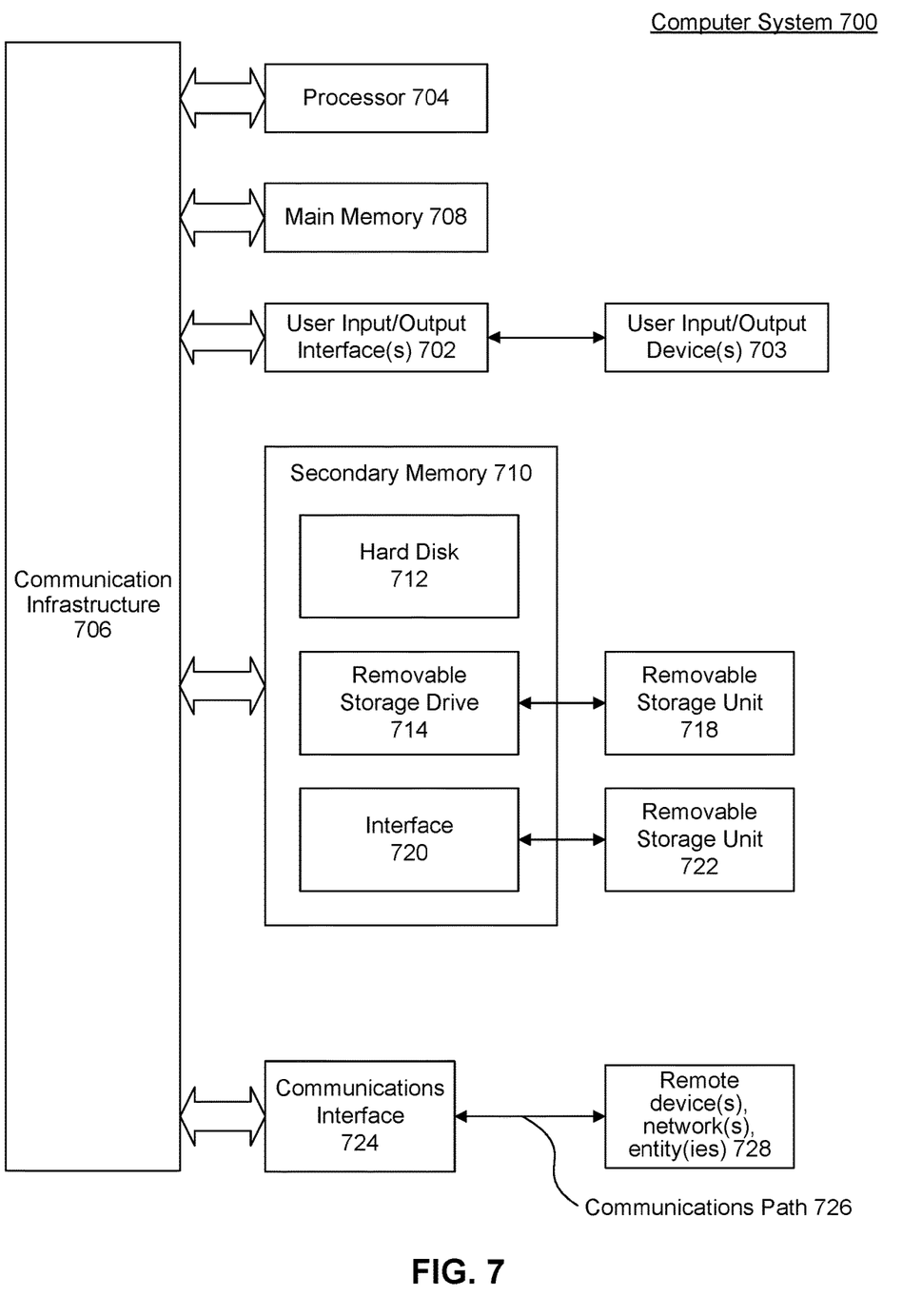
FIG. 7 illustrates a computer system, according to exemplary embodiments of the present disclosure.

Various embodiments may be implemented, for example, using one or more well-known computer systems, such as computer system 700 shown in FIG. 7. One or more computer systems 700 may be used, for example, to implement any of the embodiments discussed herein, as well as combinations and sub-combinations thereof.

Computer system 700 may include one or more processors (also called central processing units, or CPUs), such as a processor 704. Processor 704 may be connected to a communication infrastructure or bus 706.

Computer system 700 may also include user input/output device(s) 708, such as monitors, keyboards, pointing devices, etc., which may communicate with communication infrastructure 706 through user input/output interface(s) 702.

One or more of processors 704 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 may also include a main or primary memory 708, such as random access memory (RAM). Main memory 708 may include one or more levels of cache. Main memory 708 may have stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 may include a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 may read from and/or write to removable storage unit 718.

Secondary memory 710 may include other means, devices, components, instrumentalities or other approaches for allowing computer programs and/or other instructions and/or data to be accessed by computer system 700. Such means, devices, components, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 may enable computer system 700 to communicate and interact with any combination of external devices, external networks, external entities, etc. (individually and collectively referenced by reference number 728). For example, communication interface 724 may allow computer system 700 to communicate with external or remote devices 728 over communications path 726, which may be wired and/or wireless (or a combination thereof), and which may include any combination of LANs, WANs, the Internet, etc. Control logic and/or data may be transmitted to and from computer system 700 via communication path 726.

Computer system 700 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof Computer system 700 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 700 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled"and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method, comprising:
    implementing a policy on an application programming interface (API) gateway deployed between a client and an API, wherein the policy specifies a first endpoint, a second endpoint, and a triggering condition, wherein the first endpoint corresponds to a first version of the API and the second endpoint corresponds to a second version of the API;
    based on the policy, routing, by one or more processors, a first request from the client to the API received by the API gateway to the first endpoint;
    determining, by the one or more processors, a satisfaction of the triggering condition; and
    in response to the satisfaction of the triggering condition, routing, by the one or more processors, a second request from the client to the API received by the API gateway to the second endpoint.

2. The method of claim 1, wherein the first version of the API is a trial version and the second version of the API is a stable version.

3. The method of claim 2, wherein the policy further specifies a first plurality of clients to access the first version of the API and a second plurality of clients to access the second version, wherein the first plurality of clients includes the client.

4. The method of claim 3, further comprising:
    in response to the satisfaction of the triggering condition, adjusting the policy to route one or more additional requests received from a second client in the first plurality of clients to the second endpoint.

5. The method of claim 1, the determining further comprising:
    generating a user alert indicating the satisfaction of the triggering condition; and
    transmitting the user alert to an administrator.

6. The method of claim 1, wherein the triggering condition is an error percentage threshold, further comprising:
    pushing, by the one or more processors, received errors to a monitoring center;
    receiving, by the one or more processors, a notification from the monitoring center indicating that a percentage of errors exceeds the error percentage threshold; and
    in response to the notification, determining the satisfaction of the triggering condition.

7. The method of claim 1, wherein the triggering condition is a response time threshold, further comprising:
pushing, by the one or more processors, response times to a monitoring center;
receiving, by the one or more processors, a notification from the monitoring center indicating that an average response time exceeds the response time threshold; and
in response to the notification, determining the satisfaction of the triggering condition.

8. The method of claim 1, wherein the triggering condition is a utilization threshold, further comprising:
receiving, by the one or more processors, a notification from a monitoring center indicating that a CPU utilization exceeds the utilization threshold, wherein the monitoring center actively monitors the CPU utilization at a server providing the first endpoint; and
in response to the notification, determining the satisfaction of the triggering condition.

9. The method of claim 1, wherein the triggering condition is a machine learning selection, further comprising:
training a normality model against the first version on throughput, memory utilization, CPU utilization, error rate, and traffic distribution;
determining a deviation from the normality model; and
in response to the deviation, determining the satisfaction of the triggering condition.

10. A system, comprising:
a memory; and
at least one processor coupled to the memory and configured to:
implement a policy on an application programming interface (API) gateway deployed between a client and an API, wherein the policy specifies a first endpoint, a second endpoint, and a triggering condition, wherein the first endpoint corresponds to a first version of the API and the second endpoint corresponds to a second version of the API;
based on the policy, route a first request from the client to the API received by the API gateway to the first endpoint;
determine a satisfaction of the triggering condition; and
in response to the satisfaction of the triggering condition, route a second request from the client to the API received by the API gateway to the second endpoint.

11. The system of claim 10, wherein the first version of the API is a trial version and the second version of the API is a stable version.

12. The system of claim 11, wherein the policy further specifies a first plurality of clients to access the first version of the API and a second plurality of clients to access the second version, wherein the first plurality of clients includes the client.

13. The system of claim 12, the at least one processor further configured to:
in response to the satisfaction of the triggering condition, adjust the policy to route one or more additional requests received from a second client in the first plurality of clients to the second endpoint.

14. The system of claim 10, the at least one processor further configured to:
generate the policy in response to an input from an administrator in a graphical user interface provided by the API gateway, wherein the graphical user interface allows the administrator to create endpoints.

15. The system of claim 10, wherein the triggering condition is an error percentage threshold, the at least one processor further configured to:
push received errors to a monitoring center;
receive a notification from the monitoring center indicating that a percentage of errors exceeds the error percentage threshold; and
in response to the notification, determine the satisfaction of the triggering condition.

16. The system of claim 10, wherein the triggering condition is a response time threshold, the at least one processor further configured to:
push response times to a monitoring center;
receive a notification from the monitoring center indicating that an average response time exceeds the response time threshold; and
in response to the notification, determine the satisfaction of the triggering condition.

17. The system of claim 10, wherein the triggering condition is a utilization threshold, the at least one processor further configured to:
receive a notification from a monitoring center indicating that a CPU utilization exceeds the utilization threshold, wherein the monitoring center actively monitors the CPU utilization at a server providing the first endpoint; and
in response to the notification, determine the satisfaction of the triggering condition.

18. The system of claim 10, wherein the triggering condition is a machine learning selection, the at least one processor further configured to:
train a normality model against the first version on throughput, memory utilization, CPU utilization, error rate, and traffic distribution;
determine a deviation from the normality model; and
in response to the deviation, determine the satisfaction of the triggering condition.

19. A non-transitory computer-readable device having instructions stored thereon that, when executed by at least one computing device, causes the at least one computing device to perform operations comprising:
implementing a policy on an application programming interface (API) gateway deployed between a client and an API, wherein the policy specifies a first endpoint, a second endpoint, and a triggering condition, wherein the first endpoint corresponds to a first version of the API and the second endpoint corresponds to a second version of the API;
based on the policy, routing a first request from the client to the API received by the API gateway to the first endpoint;
determining a satisfaction of the triggering condition; and
in response to the satisfaction of the triggering condition, routing a second request from the client to the API received by the API gateway to the second endpoint.

20. The non-transitory computer-readable device of claim 19, wherein the first version of the API is a trial version and the second version of the API is a stable version, wherein the policy further specifies a first plurality of clients to access the first version of the API and a second plurality of clients to access the second version of claims will replace all prior versions, and listings, of claims in the application.

* * * * *